United States Patent

[11] 3,582,016

[72] Inventor Bernard C. Sherman
Apt. 502, 34 Carscadden Drive, Willowdale, Ontario, Canada
[21] Appl. No. 672,502
[22] Filed Oct. 3, 1967
[45] Patented June 1, 1971

[54] SATELLITE ATTITUDE CONTROL MECHANISM AND METHOD
38 Claims, 5 Drawing Figs.
[52] U.S. Cl. .................................................. 244/1
[51] Int. Cl. .................................................. B64g 1/00
[50] Field of Search .......................................... 244/1, 1 (SS)

[56] References Cited
UNITED STATES PATENTS
3,216,674 11/1965 Mclean .................... 244/1X
3,241,142 3/1966 Raabe ..................... 244/1X
3,358,945 12/1967 Blount et al. ............. 244/1
3,362,656 1/1968 Wyatt ..................... 244/1

Primary Examiner—Milton Buchler
Assistant Examiner—Jeffrey L. Forman
Attorney—Jack Larsen ABSTRACT: Satellites elongated by the extension of booms are stabilized in a vertical orientation by gravity-gradient. Improvement of precision by further extension of rigid booms is impractical. Gravity-gradient stabilization by a short boom and a long tether to an auxiliary body taken in combination with reaction jet control of long-period dumbbell oscillations is disclosed. In further combination with a rotor for yaw stabilization, precision three-axis gravity-gradient stabilization is achieved. The new system contemplates a tether an order of magnitude greater in length than tethers contemplated in previously disclosed arrangements.

INVENTOR
BERNARD C. SHERMAN
BY
Jack Larsen
ATTORNEY

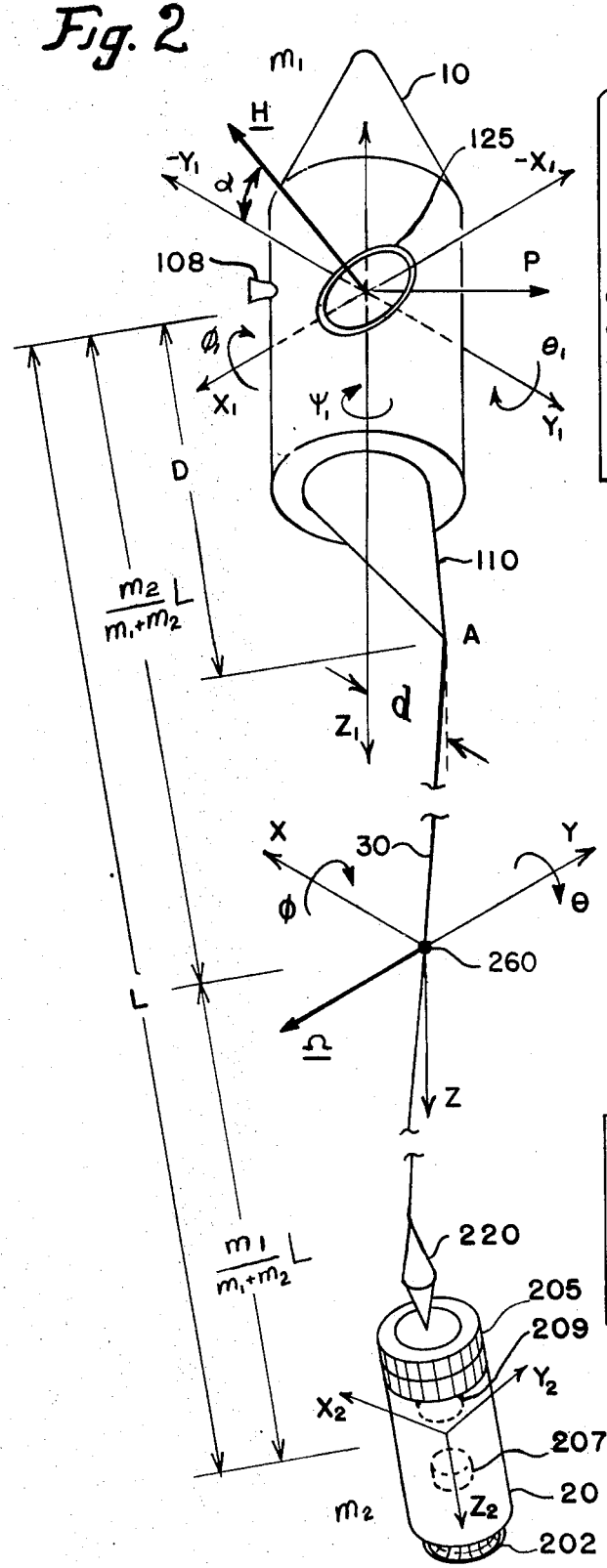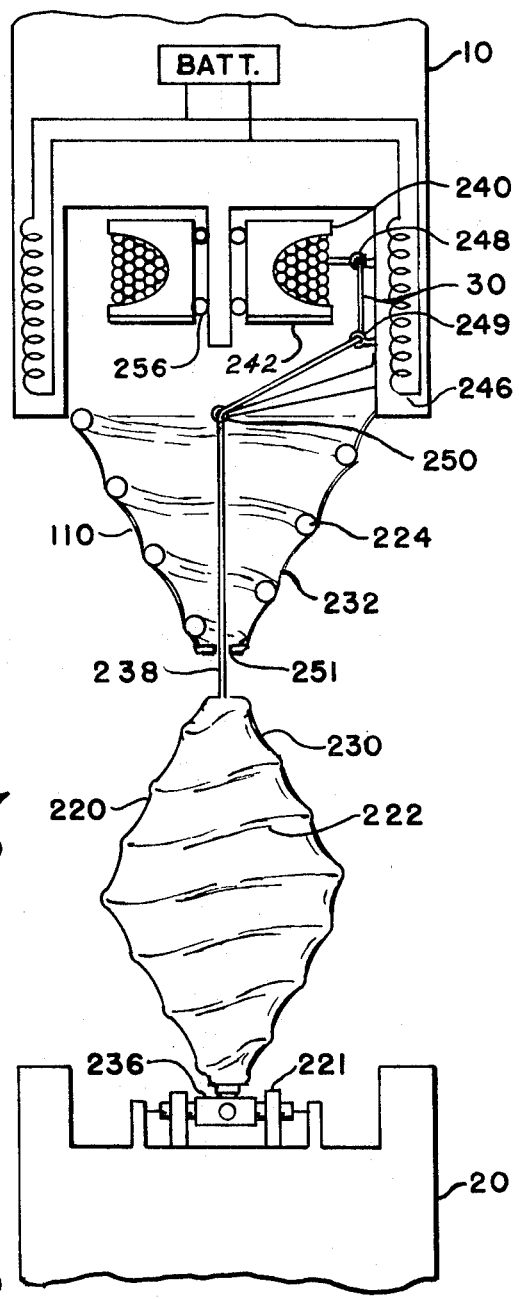

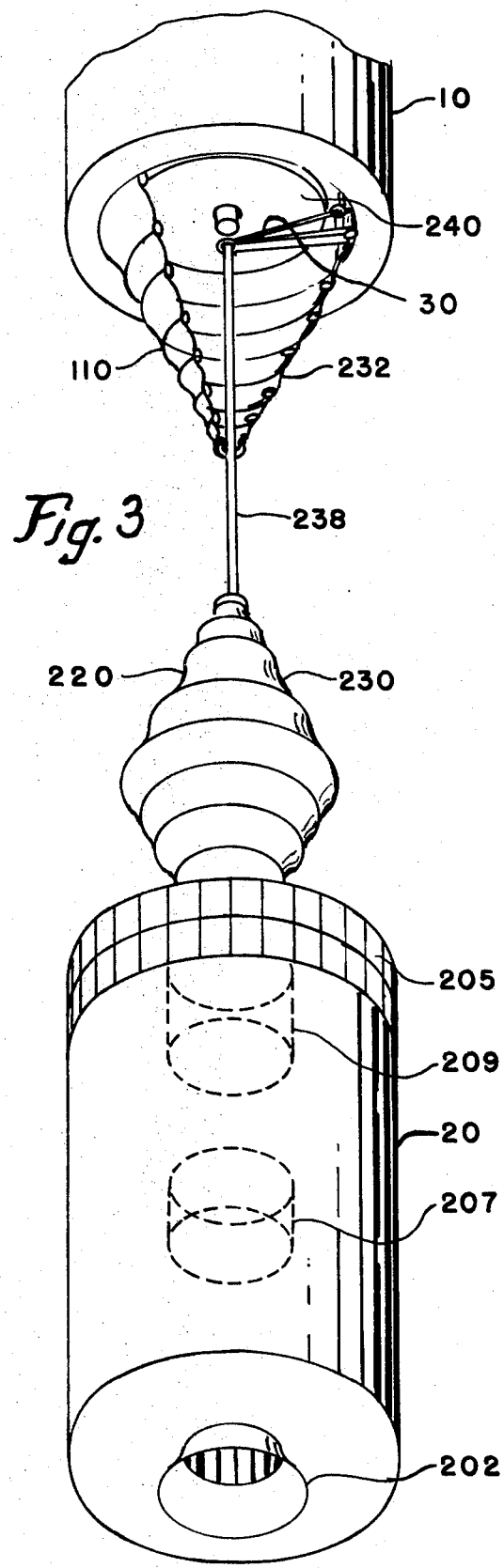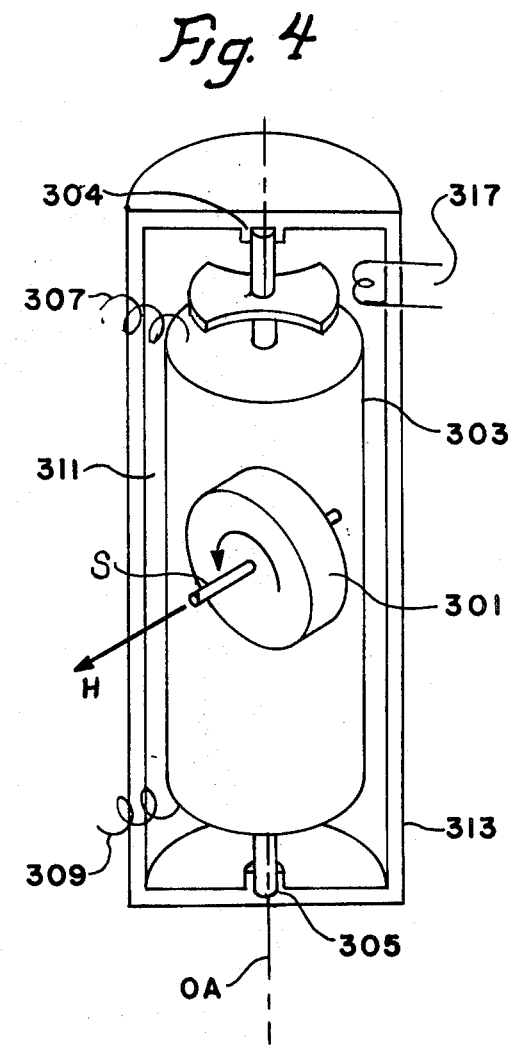

SATELLITE ATTITUDE CONTROL MECHANISM AND METHOD

This invention relates to a satellite attitude control mechanism and method of the gravity-gradient type.

Prior art systems for gravity-gradient attitude control of artificial earth satellites are represented by U.S. Pat.: Nos. 3,031,154, R. E. Roberson et al., Apr. 24, 1962, No. 3,104,080, R. E. Fischell, Sept. 17, 1963, No. 3,148,846, R.R. R. R. Sept. 15, 1964, No. 3,168,263, L. J. Kamm, Feb. 2, 1965, No. 3,171,612, B. M. Hilderbrant, Mar. 2, 1965, No. 3,206,142, H. P. Raabe, Sept. 14, 1965, No. 3,243,143, D. H. Dickstein, Mar. 29, 1966, No. 3,268,183, B. Etkin, Aug. 23, 1966, No. 3,270,984, J. E. Rice, Sept. 6, 1966, No. 3,282,532, B. E. Tinling et al., Nov. 1, 1966. Numerous papers relating to this matter have also appeared in the open literature.

It is now well known that the variation of the earth's gravitational field over the length of an earth satellite results in "gravity-gradient" torques that tend to rotate the "longest" axis of the satellite (i.e., the axis of the minimum moment of inertia) into alignment with the local vertical. These torques have been used in "gravity-gradient" attitude control systems for satellites that contain cameras, antennas, or other instrumentation that must be pointed toward the earth continuously. In most such satellites the axis that must be earth-pointing is made to coincide with the principal axis of minimum moment of inertia so that the gravity-gradient will tend to keep it vertical, and some means is provided to damp out oscillations about the equilibrium orientation. Most damping systems employ an auxiliary body coupled to the main satellite body through a dissipative device. Proper design ensures that oscillation of the main is accompanied by relative motion between the main body and auxiliary body, so that energy dissipation results.

The gravity-gradient restoring torques on a satellite are proportional to differences among the satellite's principal moments of inertia. To maximize the restoring torques relative to disturbing torques (due to solar radiation pressure or atmospheric drag; for example), it is thus necessary to have the moments of inertia about the horizontal axes much larger than the moment of inertia about the vertical axis. To achieve this result, most gravity-gradient systems deploy one or more long booms with tip masses to augment the moments of inertia about the horizontal axes. It might appear at first glance that any desired orientation accuracy could be achieved by simply using booms long enough to achieve sufficiently large restoring torques. However, in any practical system, the larger the boom, the larger the errors due to bending, both natural bending due to imperfect manufacturing and thermal bending due to uneven solar heating. Hence, for any given configuration, there is some optimum boom length, which is generally found to be between 100 and 200 feet. With this limitation, even though each system is designed to minimize the forced errors due to various disturbances, no conventional gravity-gradient system has been found capable of precision attitude control. It has generally been accepted that gravity-gradient systems are limited to accuracies of the order of 1 degree at low altitude and 2 to 5 degrees at synchronous altitude (22,300 miles).

In some of the prior art gravity-gradient systems, the effective length of the satellite is increased by one or more flexible members extended and maintained in tension by gravitational force. These members increase the gravity-gradient restoring torques without giving rise to bending errors, and therefore would appear to increase accuracy. An example is shown in the patent to Newton, in which the flexible tension member is a spring used for damping oscillations. A second example is disclosed in the patent to Raabe in which the flexible tension member is a wire. However, in both of these cases, the disclosed means for damping all modes of oscillation limits the length of the flexible tension member to not much longer than the largest rigid member of the satellite, so that these systems cannot achieve the great improvement in accuracy which a very long tether provides in the present invention.

Within the next decade, there are expected to be numerous uses for satellites requiring earth-orientation to within a small fraction of 1 degree. One of the most important of these applications appears to be a synchronous communication satellite using a highly directional transmitting antenna. Such satellites may be used both for "point-to-point communications" and for "direct broadcast" of radio or television to small regions of the earth's surface. An area of 100 miles diameter on the earth's surface corresponds to an antenna beam-width of only one-quarter of a degree from synchronous altitude (22,300 miles), so that these satellites will require orientation to within about one-tenth of a degree. It is thus useful to improve the accuracy of gravity-gradient attitude control systems, in order to make them sufficiently accurate for these missions.

Thus one object of the invention is to provide relatively accurate gravity-gradient attitude control.

Another object of the invention is to provide a gravity-gradient attitude control system that does not require deployment of long booms.

Another object of the invention is to provide a satellite configuration in which the length of the satellite is much greater than the length of the largest rigid member of the satellite.

Other objects and capabilities of the invention will become apparent from the following specification and appended drawings of which:

FIG. 2 is a schematic diagram of the vehicle illustrative of further features of the vehicle and of the axis systems selected for explanation of its operation;

FIG. 3 is a diagram of the main body and the auxiliary body at separation, showing details of the deployment system and damping boom;

FIG. 3a is a further diagram of the deployment system; and

FIG. 4 is a schematic diagram of a single degree-of-freedom gyroscope.

Figure 1:
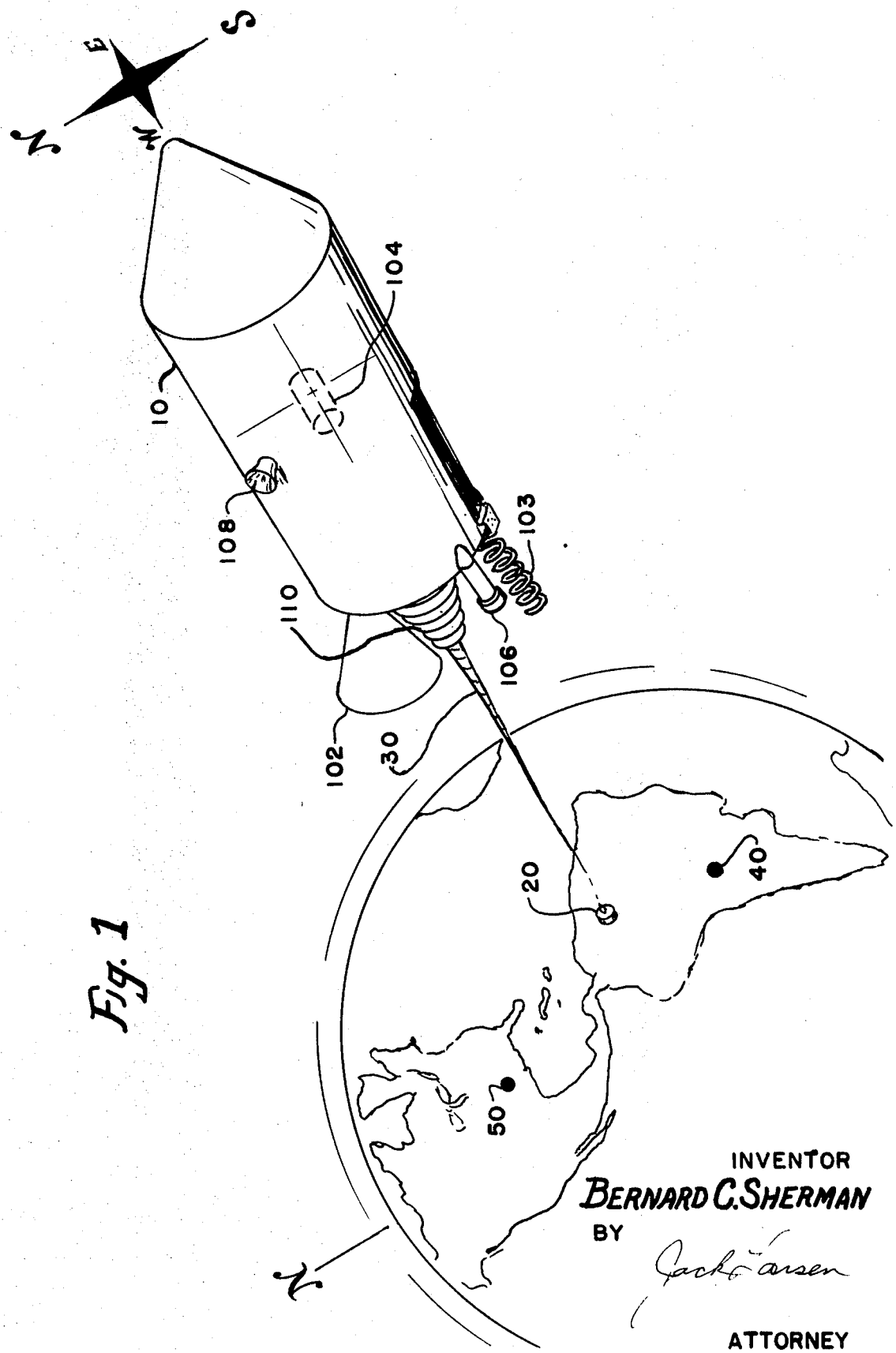
FIG. 1 is a diagram showing the overall configuration of the vehicle; and particularly the three-axis stabilized main body.

As shown in FIG. 1, the satellite comprises a main body 10, and an auxiliary body 20 interconnected by a long tether 30. Typically the longest dimension of the main body and of the auxiliary body is of the order of 20 feet, while the length of the tether is of the order of 5 miles, several orders of magnitude greater in length.

In the illustrated embodiment, the satellite is designed to broadcast into a selected region 40 of South America, programs relayed via the satellite from a ground station 50 in the United States.

Because of the precision of the present system, a highly directional microwave antenna 102 is positioned to have its axis along the line of sight from the station 50 to the body 10. An end-fire helical antenna 103 is simultaneously pointed at the target region 40; and, in equilibrium the projection of the tether 30 extends straight down toward a point on the equator just off the coast of Ecuador.

The satellite is in synchronous equatorial orbit, travelling eastwardly at earth's angular rate.

Gravity-gradient provides a reference and a force for pitch and roll stabilization. Yaw stabilizing forces are exerted by a gyroscope 104. Angular error is sensed by measurement of variations in the signal strength received either by antenna 102 in the vehicle or by an antenna in target region 40 on the ground. Measurement of signal fluctuations at the missile is an adaptation of the technique of beacon tracking by radar, while analysis of attitude by fluctuations in received signal strength on the ground is a variation of the well-known technique first reported in the open literature by Dr. S. J. Raff in a paper: "Yaw Measurements on a Rotating Projectile by R. F. Link" reported in Proceedings of the National Electronics Conference, Vol. 8 (1952) at page 692, published by the National Electronics Conference, 852 East 83rd Street, Chicago, Illinois. Further information regarding attitude error is established by horizon sensing optics 106 of appropriate design as well known in the art, such as, for example, the horizon scanning instrument disclosed in U.S. Pat. No.

3,201,591 issued Aug. 17, 1965 to R. W. Froelich, or the instrument disclosed in the paper "Attitude Reference Devices" by P. E. Kendall and R. E. Stalcup in Proceedings of the IRE v. 48, p. 765 ff.. The application of horizon scanning to attitude sensing in satellites is discussed at length by Barbara K. Lunde in her contribution to the book Torques and Attitude Sensing In Earth Satellites by S. Fred Singer, Academic Press, New York, 1964 beginning at page 221.

There are long-period "dumbbell" modes of oscillation of the entire vehicle about the vertical. These oscillations are stopped by changing the speed of the main body 10 by precise amounts, and at predetermined moments, such that the angular rate of the vehicle becomes the same as orbital angular velocity. The last such adjustment must be made when the tether is vertical.

The adjustments are made by one or more thrusters 108 having thrust axes in the horizontal plane passing through the center of mass of the main body 10. The same thrusters also provide for slight corrections to the orbit.

To increase the stabilizing torque applied to the main body 10 by tether 30, the point at which the tether attaches to the main body is extended outward by a structure 110.

As shown schematically in FIG. 2, the auxiliary body 20 needs substantial mass. This is achieved by using as the auxiliary body the last stage of the launch vehicle. It includes the spent engine 202 and empty tankage. The body 20 may also contain auxiliary apparatus and provides convenient isolation for antenna 205 or a radioactive source 207. In this embodiment it includes a radio repeater 209 so that signals from the station 50 may follow two paths, a direct path from station 50 to main body 10, and a relay path from station 50 to body 20 to body 10. Microwave interferometry on the long baseline provided by the tether provides a precise technique for measuring one component (substantially roll) of dumbbell orientation. If signals are received from a second ground station at a different location, then a second component (pitch) may also be measured. From these measurements the precise corrective impulses may be calculated. Microwave interferometry as a precision tracking technique is well known in the space electronics art as a means of relating a point to a base line. In typical systems, such as "Mistram" (see Electronics Nov. 17, 1961 p. 109, or "Minitrack" Proc. IRE v. 44 pp. 755—760) the base line is fixed on the earth and the point is a missile. Appropriate modification of equipment to provide for the baseline in the missile having great length may readily be effected.

As launched, the main body 10 is joined to the auxiliary body 20 which is also the last stage of the launch vehicle. The antennas 102, 103 are folded into the main body 10. The structure 110 and the boom 220 are both extensible in the manner of a jack-in-the-box; as shown in FIGS. 1—3, the spring portions 224 and 222 are stabilized in their extended positions by webs 232 and 230.

The boom 220 is attached at one end to the tether and at the other end to the tankage by means of a 2-degree-of-freedom torsion-wire hinge 236, details of which are shown in FIG. 3a.

The springs 222 and 224 provide the energy for extension of the tether. Separation of the two bodies is effected by releasing their interconnecting linkage, now shown, when the vehicle is in the desired orbit and station and at substantially the proper pitch and roll angles.

The leader portion 238 of the tether is reinforced and withstands the force required to accelerate the turning of the spool 240 as the bodies 10 and 20 separate. The separation velocity is slowed by friction of the spool 240 and by a calculated additional drag so that the paying out of the tether is stopped smoothly without a jerk at the predetermined length.

In the following explanation of the invention, significant relationships may be stated without proof. For the analysis and for further details, the reference may be made to my doctoral thesis entitled "Precision Gravity-gradient Satellite Attitude Control," submitted to the Department of Aeronautics and Astronautics at the Massachusetts Institute of Technology, dated Jan. 9, 1967.

As explained above, accurate gravity-gradient attitude control requires large gravity-gradient restoring torques, and hence large differences among the principal moments of inertia of the satellite. This in turn requires large satellite length. But as also explained previously, this result cannot readily be achieved by the extension of long stiff booms, since such members themselves introduce substantial errors due to natural and thermal bending. An embodiment of the invention that overcomes these problems to achieve precise orientation is shown in FIG. 1. Large satellite length is achieved through the use of an auxiliary body 20 attached to the main body 10 of the satellite by the very long, lightweight, flexible tether 30. The tetherline is nominally vertical and the tether is kept in tension by the gravity-gradient field and the centrifugal field due to rotation of the vehicle at orbital angular velocity $\Omega$. In FIG. 1, the auxiliary body 20 is shown to be below the main body 10, but the configuration is equally stable in the inverted orientation. The length L of the tether as a matter of design choice may be from as little as 1,000 feet to as much as 100 miles or more, but a typical length is about 5 miles. The maximum dimension of the main body is only on the order of tens (or perhaps hundreds) of feet, so that a tether length of the order of 5 miles is sufficient to be very much larger than the maximum rigid dimension of the main body. The main body 10 carries the antennas 102, 103 or other instrumentation that requires earth-orientation and generally has a mass of hundreds or thousands of pounds. The main body is not necessarily a single rigid body but may be a composite body including many interconnected rigid and nonrigid parts. The mass of the auxiliary body may be as small as a few pounds. However, the restoring torque for each of the degrees of freedom increases with increasing auxiliary body mass, so that it is desirable to have the auxiliary body mass as large as possible. Any weight will do, but economy suggests that the weight be that of a useful structure, such as a second active satellite (i.e., a second main body) or the expended last stage of the launch vehicle as shown.

Referring again to FIG. 2, the frame of reference to which the vehicle is stabilized is designated by the axes $x$, $y$, $z$, with origin at the vehicle mass center 260. The $x$ axis is horizontal in the plane of the orbit; for a circular orbit, it also lies along the direction of orbital motion of the satellite (east for a synchronous satellite as shown). The $y$ axis is perpendicular to the orbital plane, opposite to the orbital angular velocity vector of the vehicle, (south, as shown). The $z$ axis is vertical, directed downward. The $x$, $y$, and $z$ axes are conventionally called the roll, pitch, and yaw axes respectively.

The $x_1$, $y_1$, and $z_1$ axes, also shown in FIG. 2, are those axes of the main body 10 (i.e., fixed to the main body) which are to be stabilized parallel to the $x$, $y$, and $z$ axes respectively. If the two axis systems do not appear approximately parallel in FIG. 2, this is only because the observer is above the center of mass 260 but below the main body 10. Similarly the $x_2$, $y_2$, and $z_2$ axes are those axes of the auxiliary body 20 which are to be stabilized parallel to the $x$, $y$, and $z$ axes respectively.

Since the dimensions of both end bodies are very much smaller than the length of the tether, the analysis of the system is separable into two distinct domains. The first domain is rotational dynamics of the whole satellite modeled as a rigid dumbbell, in which the main and auxiliary bodies are taken to be point masses. The second domain is the rotational dynamics of each of the two bodies individually about their respective centers of mass, and may include the effects of transverse waves in the tether.

There are but 2 degrees-of-freedom for rotation of the whole satellite modeled as a rigid dumbbell. These are rotation about the $y$ axis through angle $\theta$ (pitch) and rotation about the $x$ axis through angle $\Phi$ (roll). For small angles it does not matter in which order the rotations are taken. When the dumbbell is in its nominal or equilibrium orientation, the tetherline is vertical and both $\theta$ and $\Phi$ are zero. Since the dumbbell is very long, it has very large differences between its principal moments of inertia as required to develop large gravity-gradient restoring torques. Hence when either $\theta$ or $\Phi$ is nonzero, there is a large restoring torque tending to rotate the axis of the dumbbell (i.e., the tetherline) back into alignment with the local vertical. It follows that solar radiation pressure and other disturbances cause only relatively small forced errors, so that the tetherline is accurately aligned with the local vertical in the steady state (provided that all modes of transient oscillation can be damped, as will be explained later).

Since the instrumentation requiring earth-orientation will generally be in the main body, it is required that the axis $z_1$ of the main body, and not just the tetherline, be accurately vertical. The main body has 3 rotational degrees of freedom. These are rotation about the $y_1$ axis through angle $\theta_1$ one (pitch), rotation about the $x_1$ axis through angle $\Phi_1$ one (roll), and rotation about the $z_1$ axis through angle $\psi_1$ one (yaw). For small angles, it does not matter in what order the three rotations are taken. When the main body is in its nominal or equilibrium orientation, all three angles are zero. As seen in FIG. 2, the tether is attached to the main body at a point A at some distance D from the center of mass of the main body. If in FIG. 2, we take offset distance $d$ to be zero (to be explained below), then the attachment point A is on the $z_1$ axis of the main body. Then if the $z_1$ axis of the main body is not aligned with the direction of the tether, (which is vertical in the steady state as explained above), the tension $T$ in the tether applied to the end of moment arm D provides a restoring torque to effect such alignment. It can be shown that for a circular orbit the tension $T$ in the vertical tether is given by the expression:

$$T = 3\Omega^2 \frac{m_1 m_2}{m_1 + m_2} L$$

Where $L$ = distance between the centers of mass of the main and auxiliary bodies
$\cong$ length of the tether, since D << L
$m_1$ mass of the main body 10
$m_2$ mass of the auxiliary body 20
and $\Omega$ = orbital angular velocity Hence the restoring torque on the main body is proportional to DL. Although moment arm D is relatively small, length $L$ is very large so that the restoring torque on the main body is relatively large when compared with the restoring torques on prior art gravity-gradient satellites. Thus solar pressure, magnetic torques, and other disturbances produce only relatively small forced errors in the main body degrees-of-freedom. This result is achieved without requiring any very long rigid members, so that the accuracy is not offset by distortion of the main body due to thermal expansion or other causes.

As so far described, the tension in the tether stabilizes the main body with respect to rotation about the $y_1$ and $x_1$ axes (pitch and roll). However the main body is still free to rotate about the $z_1$ axis (i.e., the vertical or yaw axis). In a similar manner, the tension in the tether stabilizes the auxiliary body with respect to rotation about the $y_2$ and $x_2$ axes (pitch and roll), but not with respect to rotation about the $z_2$ axis (yaw). In this embodiment, it is necessary to have the main body stabilized about all three axes. Yaw stabilization of the main body is achieved by placing in the main body a rotor or flywheel 125 as shown in FIG. 2. The rotor can either be mounted with its spin axis fixed in the main body, or alternatively it can be mounted in a single-degree-of-freedom gimbal so that it becomes a single-degree-of-freedom gyroscope 104 as will be explained below. In either case it can be shown that the rotor must be constrained or torqued such that its angular momentum vector, $H$, is nominally in the plane containing the $y_1$ and $z_1$ axes (i.e., the plane of the main body that is to be stabilized vertically and perpendicular to the orbital plane). The $H$ vector can be either along the $-y_1$ axis or at some acute angle $\alpha$ to the $-y_1$ axis. The components of $H$ along the $x_1, y_1,$ and $z_1$ axes are then:

$H_x = 0 \qquad H_y = -H\cos\alpha \qquad \text{and } H_z = -H\sin\alpha$ where $\alpha$ is between $-90°$ and $+90°$. FIG. 2 shows only one rotor; if the main body contains more than one rotor, then vector $H$ is the sum of the angular momentum vectors of all the rotors. The angular momentum of the main body itself is negligible in the typical case. In the steady state, the vertical or $z_1$ component of $H$ must be precessed at orbital angular velocity $\Omega$, requiring a torque about the $x_1$ axis given by:

torque $= \Omega H \sin \alpha$

As shown in FIG. 2, the necessary torque is achieved by attaching the tether to the structure 110 at a point A in the $y_1 z_1$ plane offset a distance $d$ from the $z_1$ axis. The equilibrium torque applied by the tether about the $x_1$ axis is then torque $= Td$ where $T$ is the tension in the tether, for which an algebraic expression has been given above. Equating the two expressions for torque given above yields:

$Td = \Omega H \sin \alpha$ from which the required offset distance $d$ is found. In the simplest case both the angle $\alpha$ and the offset distance $d$ are zero, but in some applications it may be desirable to have nonzero values. It can be shown that the rotor 125 provides resistance to disturbances about the $z_1$ or yaw axis of the main body. By using one or more rotors with large enough angular momenta, it is possible to achieve gyroscopic yaw restoring torques that are as large as the pitch and roll restoring torques applied by the tether.

As indicated above, the invention achieves relatively large restoring torques per unit error angle for all degrees of freedom, so that the forced errors are relatively small. However, aside from the steady state forced errors, there are also transient oscillations of the vehicle about the equilibrium orientation due to nonideal initial conditions or subsequent excitation by meteoroid impacts or other aperiodic disturbances. To ensure that the vehicle settles to its desired state, mechanisms are provided for damping all modes of oscillation. It has been explained that the dynamics are separable into two distinct domains. The first domain is dynamics of the whole satellite as a dumbbell. The second domain is the rotational dynamics of each of the two bodies individually about their respective centers of mass, and may include effects of transverse waves in the tether. It is therefore necessary to provide at least two different damping mechanisms; one for the rotational oscillations of the whole satellite modeled as a dumbbell (i.e., oscillations of the tetherline about the local vertical), and one for rotational oscillations of the main body. If the auxiliary body also contains instrumentation requiring attitude control (as it does in the given embodiment), then a third damping mechanism may be required to damp the rotational oscillations of the auxiliary body.

DAMPING OF DUMBBELL OSCILLATIONS

The dimensions of the main body and of the auxiliary body are very much smaller than the length of the tether; hence it is clear that any device in either of the bodies that simply applies torque to the body has no significant effect on energy of the dumbbell oscillations. There are two mechanisms by which the dumbbell oscillations can be damped. The first is variation of the length of the tether; the second is the firing of one or more thrusters located in one of the bodies.

A system for damping the dumbbell oscillations by varying the length of the tether is considered in Chapter IV of the aforementioned thesis. The system uses a spool located in the main body to wind the tether in and out as required to effect damping. It is shown that the coupling between extensional motion and pitch oscillation of the dumbbell is due to linear Coriolis terms so that very fast pitch damping can be achieved. However the coupling between extensional motion and roll oscillation of the dumbbell is due to only second order centrifugal terms. Roll damping therefore tends to be inadequate at small amplitudes of oscillation.

A mechanism effective for damping of both the pitch and the roll oscillations of the whole satellite as a dumbbell is the firing of one or more thrusters located in the main body, to adjust the angular rate of the dumbbell system about its center of mass 250. One such thruster 108 is shown in FIG. 1. As shown in FIG. 2, the axis P of its thrust is in the $x_1y_1$ plane of the main body 10 and is therefore nominally horizontal, and it also is directed through the center of mass of the main body to avoid undesired excitation of the main body oscillations when the thruster is fired. Before the dumbbell oscillations can be damped by fixing the thruster(s), it is necessary that the oscillations be measured so that the required thrust impulses can be computed. Hence the damping system must include at least one attitude or attitude-rate sensing mechanism, the output of which is sensitive to the dumbbell oscillations. One suitable sensor is a linear-scan horizon sensor 106 indicated in FIG. 1 and used to measure the angle between the $z_1$ axis of the main body and the horizon in a nominally vertical plane yawed at some arbitrary angle from the $x_1z_1$ plane. The output of the sensor 106 is preferably telemetered to the ground and there processed or filtered to obtain an ever-improving estimate of the state of the dumbbell oscillations. The thrust impulses needed to minimize the oscillations are then calculated on the ground and commanded from the ground to the satellite.

Besides horizon measurements, there are numerous other measures of the dumbbell oscillations; may of these are described in Chapter V of the thesis. A particularly simple and preferred method of sensing the oscillations is applicable to a satellite as shown, having a highly directional antenna 103 to transmit to a small region on the earth's surface. For such a vehicle the dumbbell oscillations can be sensed by measuring the variations in the received signal strength at one or more points in the target region on the ground. This measurement scheme eliminates the need for onboard sensors. All sensing and processing is done on the ground, and the vehicle contains only the thruster or thrusters, which are fired on command from the ground. As mentioned above, extremely precise measurements can also be made by microwave interferometry using a repeater 209 and auxiliary antenna 205 in the body 20.

DAMPING OF BODY OSCILLATION

There are numerous simple passive means to provide adequate damping for the rotational oscillations of the bodies 10 and 20. These include known devices to damp nutational oscillations in spin-stabilized vehicles or to damp rotational oscillations in prior art gravity-gradient systems. Three means are particularly effective as applied to the instant invention.

The first means provides for dissipation of energy by mechanical hysteresis in the tether. It has already been noted that rotational oscillations of a body are coupled to transverse waves in the tether; the amount of coupling increases with increasing weight of the tether. Hence, selecting a tether heavy enough to give strong coupling, and made of, or coated with, a material subject to large mechanical hysteresis energy loss renders the coupled oscillations well damped by mechanical hysteresis.

The second damping mechanism embodied in the body 20 is a damper boom 220, which is nominally vertical as shown in FIGS. 2 and 3 and joins the tether 30 to the rest of the body 20; the boom is connected to the rest of the body 20 through either a single-degree-of-freedom or a 2-degree-of-freedom torsion-wire hinge 236 such as shown in FIG. 3 of the above-mentioned Kamm patent. The torsion wires provide a suspension that is free of static friction. Each axis of the suspension also is equipped with an eddy-current or magnetic-hysteresis damper 221. Oscillations of the main body force motion in the hinge and hence energy dissipation in the dampers.

The third damping means is applied to a main body using one or more rotors for yaw stabilization as previously described. It has been explained that the total angular momentum vector of the rotors is nominally oriented in the plane of the main body that is to be stabilized vertically and perpendicular to the orbital plane. Instead of fixing the spin axis of each rotor in the main body, a rotor is mounted in a single-degree-of-freedom gimbal so that it becomes a single-degree-of-freedom gyroscope 104. The most important features of the typical single-degree-of-freedom gyroscope are shown schematically in FIG. 4. The basic element is the rotor 301 which spins rapidly about the spin axis S and provides the required angular momentum vector $H$. The spinning rotor element is enclosed in a sealed gimbal can 303, which is constrained by pivots 304, 305 to turn only about a "gimbal" or "output" axis OA. Current to drive the rotor is brought into the gimbal can be means of highly compliant flex leads 307, 309. The gap 311 between the gimbal can 303 and the gyro case 313 is filled with a suitable fluid, the viscous shear of which provides the desired degree of damping of motion about the gimbal axis. Rotational oscillations of the main body force gyroscope rotations about the gimbal axis OA with the result that the oscillations are damped out by dissipation of energy in the viscous resistance of the fluid. In addition to damping torques provided by the fluid, it may be necessary to apply either a steady torque or a spring-restraint torque to the output axis of the gyroscope in order to hold the spin axis of the rotor in its nominal orientation at equilibrium. In general, this will be necessary unless the nominal orientation of the spin axis coincides with the $-y_1$ axis of the main body. The required torque can be applied by a magnetic or electromagnetic torque generator 317, of which many types are well known in the art (shown symbolically) or by a mechanical spiral spring (not shown).

DEPLOYMENT

FIGS. 3 and 3a further illustrate the system for deployment of the auxiliary body 20, which is attached to the main body during launch and orbital injection. The spool 240 for storage of the tether is shown to be on the main body 10, but in a smaller vehicle it probably would be placed on the auxiliary body 20 which might otherwise be "dead weight." After orbital injection, gas jets (not shown) are used to spin up the vehicle about the deployment axis, which should also be the principal axis of either maximum or minimum moment of inertia, (or the vehicle may already be spinning if the last stage of the launch vehicle is spin stabilized). The spin axis is then torqued into the orbital plane, also by gas jets. When the point in the orbit is reached at which the spin axis has the correct pitch angle for deployment, the main structural connections between the bodies 10 and 20 are released and separation is effected by a rapid initial extension of the deployment springs 224 and 222 which are parts of the structures 110 and 220 respectively. The spring force accelerates the bodies and also causes a tug on the leader portion 238 of the tether 30 to give the required angular acceleration to the spool 240 on which the tether is stored. After the initial kick of the springs, the bodies 10 and 20 begin to diverge in their orbital paths. Thereafter a measured drag is applied to the spool 240 to prevent tangling of the tether, and to stop the extension of the tether at the predetermined length L without a jerk.

The drag can be applied to the spool by means of an eddy-current brake comprising a copper drag disc 242 on the spool 240 and one or more electromagnets 246. The field of the electromagnets is controlled as a function of time and intercepts the disc 242 to produce the required deceleration history. If necessary, control may be effected in a closed loop system by measuring the spool rotation angle or rate, comparing it to a nominal value, and changing the electromagnet currents to effect corrections. Some further deceleration is provided by friction in the eyelets 248, 249, 250, 251 and bearings 256, but it is desirable to keep this small since it is not accurately predictable. During or after deployment, the main body 10 is despun. This can be done by gas jets, by a yoyo despin mechanism, by the main body damping system, or perhaps by spinning up the yaw-stabilization rotor. It may also be necessary to despin the auxiliary body 20, in order to prevent the tether from twisting up.

APPLICATIONS

Although the present invention is useful mainly as an attitude control system, the fact that it achieves great satellite length may make it useful in other respects. For example, in a satellite containing nuclear reactors as a power supply, the need for heavy shielding to prevent radiation damage to men or equipment in the satellite can be eliminated by using the reactor as the auxiliary body so that it will be gravity-gradient stabilized at a large distance from the main body; electrical cables would then be used as the flexible tether and would also conduct power to the main body. Another possible application is the use of a conductive tether as long wavelength radio antenna.

In light of the above description, many modifications and variations of the present invention are possible.

I claim:

1. In combination:
   a. a satellite main body adapted for projection into an orbit around the earth,
   b. an auxiliary body,
   c. means for effecting deployment of said auxiliary body in space substantially vertically at a distance from said main body which is more than 10 times the length of any rigid part of said main body,
   d. a flexible tether adapted for maintaining interconnection of said bodies so deployed and for maintaining said distance by tension therein,
   e. facilities for storing said tether compactly for launching into orbit, said tether being withdrawable from said facilities during said deployment,
   f. means for measuring the state of oscillations tilting the tetherline from the local vertical.
   g. a thruster in said main body positioned to provide thrust directed substantially horizontally and through the center of mass of said main body, said thrust being controllable in response to the output of said means for measuring so as to reduce the amplitude of said oscillations of the tetherline, and
   h. means for damping rotational oscillations of said main body.

2. The combination as defined by claim 1 wherein said tether is substantially without bending stiffness, light in weight, and more than 30 times the length of any rigid part of said main body.

3. The combination as defined by claim 1 wherein one of said bodies comprises a first portion, a second portion, and a damping hinge interconnecting said first and second portions.

4. The combination as defined by claim 1 wherein said main body includes earth-pointing instrumentation.

5. The combination as defined by claim 4 wherein said instrumentation comprises a directional antenna.

6. The combination as defined by claim 1 wherein said last-named means comprises a single-degree-of-freedom gyroscope.

7. The combination as defined by claim 1 wherein said main body comprises a structure attached to said tether and extensible in orbit, thereby to provide a point of attachment of said tether to said main body relatively distant from the center-of-mass of said main body.

8. The combination as defined by claim 1 wherein said auxiliary body is releasably attachable to said main body for transport into orbit and said deployment means comprises means for thrusting said auxiliary body away from said main body consequent upon its release therefrom.

9. The combination as defined by claim 8 wherein said auxiliary body is the last stage of the launch vehicle which places said main body into orbit.

10. The combination as defined by claim 1 wherein said means for measuring is an earth-horizon sensor.

11. The combination as defined by claim 1 wherein said means for measuring comprises ground-based means for measuring the strength of radio signals received from a directional radio antenna mounted on said main body.

12. The combination as defined by claim 1 wherein the thrust of said thruster is controllable by radio command from the ground consequent upon ground-based analysis of the output of said means for measuring.

13. The combination as defined by claim 2 wherein the length of said tether is more than 100 times the greatest dimension of any rigid part of said main body.

14. The combination as defined by claim 2 wherein the length of said tether is more then 500 times the greatest dimension of any rigid part of said main body.

15. The combination as defined by claim 2 wherein one of said bodies comprises a first portion, a second portion, and a damping hinge interconnecting said first and second portions.

16. The combination as defined by claim 7 wherein said last-named means comprises a single-degree-of-freedom gyroscope.

17. The combination as defined by claim 8 wherein said last-named damping means comprises a single-degree-of-freedom gyroscope.

18. The combination as defined by claim 10 wherein said means for damping comprises a single-degree-of-freedom gyroscope.

19. The combination as defined by claim 11 wherein said last-named damping means comprises a single-degree-of-freedom gyroscope.

10. The combination as defined by claim 12 wherein said last-named means comprises a single-degree-of-freedom gyroscope.

21. The combination as defined by claim 8 wherein said main body comprises a structure attached to said tether and extensible in orbit, thereby to provide a point of attachment of said tether to said main body relatively distant from the center-of-mass of said main body.

22. The combination as defined by claim 10 wherein said main body comprises a structure attached to said tether and extensible in orbit, thereby to provide a point of attachment of said tether to said main body relatively distant from the center-of-mass of said main body.

23. The combination as defined by claim 11 wherein said main body comprises a structure attached to said tether and extensible in orbit, thereby to provide a point of attachment of said tether to said main body relatively distant from the center-of-mass of said main body.

24. The combination as defined by claim 12 wherein said main body comprises a structure attached to said tether and extensible in orbit, thereby to provide a point of attachment of said tether to said main body relatively distant from the center-of-mass of said main body.

25. The combination as defined by claim 12 wherein said auxiliary body is releasably attached to said main body for transport into orbit and said deployment means comprises means for thrusting said auxiliary body away from said main body consequent upon its release therefrom.

26. The combination as defined by claim 3 wherein said auxiliary body is the last stage of the launch vehicle which places said main body into orbit.

27. The combination as defined by claim 6 wherein said auxiliary body is the last stage of the launch vehicle which places said main body into orbit.

28. The combination as defined by claim 7 wherein said auxiliary body is the last stage of the launch vehicle which places said main body into orbit.

29. The combination as defined by claim 10 wherein said auxiliary body is the last stage of the launch vehicle which places said main body into orbit.

30. The combination as defined by claim 11 wherein said auxiliary body is the last stage of the launch vehicle which places said main body into orbit.

31. The combination as defined by claim 12 wherein said auxiliary body is the last stage of the launch vehicle which places said main body into orbit.

32. The combination as defined by claim 12 wherein said means for measuring is an earth-horizon sensor.

33. The combination as defined by claim 12 wherein said means for measuring comprises ground-based means for measuring the strength of radio signals received from a directional radio antenna mounted on said main body.

34. In combination:
 a. a satellite main body adapted for projection into an orbit around the earth,
 b. an auxiliary body,
 c. a flexible tether,
 d. facilities for containing said tether compactly for launching,
 e. means for effecting deployment of said auxiliary body in space substantially vertically at a distance from said main body which is more than 10 times the length of any rigid part of said main body, for withdrawing said tether from said facilities during said deployment, and for maintaining said distance by tension in said tether,
 f. means for measuring the state of oscillations tilting the tetherline from the local vertical,
 g. a thruster in said main body positioned to provide thrust directed substantially horizontally and through the center of mass of said main body, said thrust being controllable in response to the output of said means for measuring so as to reduce the amplitude of said oscillations of the tetherline, and
 h. means for damping rotational oscillations of said main body.

35. In combination:
 a. a satellite main body adapted for projection into an orbit around the earth,
 b. an auxiliary body,
 c. a flexible tether adapted for maintaining taut interconnection of said bodies substantially along the local vertical, the length of said tether being at least 10 times the greatest dimension of any rigid part of said main body,
 d. means for effecting deployment of said auxiliary body to the required position relative to said main body after orbital injection,
 e. facilities for storing said tether completely for launching into orbit, said tether being withdrawable from said facilities during said deployment,
 f. means for measuring the state of oscillations tilting the tetherline from the local vertical,
 g. a thruster in said main body positioned to provide thrust directed substantially horizontally and through the center of mass of said main body, said thrust being controllable in response to the output of said means for measuring so as to reduce the amplitude of said oscillations of the tetherline, and
 h. means for damping rotational oscillations of said main body.

36. For use with a satellite main body adapted for projection into an orbit around the earth, a system for maintaining said body in a preferred earth orientation comprising;
 a. an auxiliary body,
 b. a tether,
 c. facilities for containing said tether for launching,
 d. means for deploying said auxiliary body in space at a distance from said main body which is more than 20 times the length of any rigid part of said main body, connected to said main body by said tether, and for maintaining said distance by tension in said tether,
 e. reaction means, part of said main body, positioned to provide thrust directed substantially horizontally and through the center of mass of said main body,
 f. means for measuring the state of dumbbell oscillations of said tetherline,
 g. means for controlling said thrust responsive to the state of said dumbbell oscillations, and
 h. means for damping rotational oscillations of said main body.

37. The combination as defined by claim 36 wherein said main body contains for yaw stabilization, a rotor constrained with its spin axis oriented so as to produce a substantial quantity of angular momentum directed substantially in that plane of the main body that is to be stabilized vertically and perpendicular to the orbital plane.

38. The combination as defined by claim 37 wherein said rotor is the rotor element of a gyroscope and said gyroscope comprises viscous damping means applied to its gimbal axis motion.